US010763036B2

(12) United States Patent
Ishida et al.

(10) Patent No.: US 10,763,036 B2
(45) Date of Patent: Sep. 1, 2020

(54) COMPOSITE ELECTRONIC COMPONENT AND MANUFACTURING METHOD FOR SAME

(71) Applicant: Murata Manufacturing Co., Ltd., Kyoto-fu (JP)

(72) Inventors: Daisuke Ishida, Nagaokakyo (JP); Kazuhide Kudo, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 421 days.

(21) Appl. No.: 15/730,963

(22) Filed: Oct. 12, 2017

(65) Prior Publication Data

US 2018/0114633 A1 Apr. 26, 2018

(30) Foreign Application Priority Data

Oct. 21, 2016 (JP) ................................. 2016-207135

(51) Int. Cl.
*H01F 27/40* (2006.01)
*H01G 4/224* (2006.01)
(Continued)

(52) U.S. Cl.
CPC .............. *H01F 27/40* (2013.01); *H01F 27/24* (2013.01); *H01F 27/2804* (2013.01);
(Continued)

(58) Field of Classification Search
CPC .......... H01F 27/40; H01F 27/24; H01G 4/224
See application file for complete search history.

(56) References Cited

U.S. PATENT DOCUMENTS 5,892,668 A * 4/1999 Okamoto ............ H01F 27/2804
363/40
7,202,107 B2 * 4/2007 Fuergut ................. H01L 21/568
257/E21.502
(Continued)

FOREIGN PATENT DOCUMENTS

JP S59-135628 U 9/1984
JP S61-009918 U 1/1986
(Continued)

OTHER PUBLICATIONS

An Office Action; "Notification of Reasons for Refusal," Mailed by the Japanese Patent Office dated Feb. 5, 2019, which corresponds to Japanese Patent Application No. 2016-207135 and is related to U.S. Appl. No. 15/730,963; with English language translation.

*Primary Examiner* — Scott Bauer
(74) *Attorney, Agent, or Firm* — Studebaker & Brackett PC

(57) ABSTRACT

A composite electronic component that includes a first electronic component that includes a first element body, a first functional element that is provided inside the first element body, and first outer electrodes that are provided on one surface of the first element body and are electrically connected to the first functional element. A second electronic component includes a second element body, a second functional element that is provided inside the second element body, and second outer electrodes that are provided on one surface of the second element body and are electrically connected to the second functional element. A resin body, in which the first electronic component and the second electronic component are buried, exposes the first outer electrodes and the second outer electrodes from the resin body.

19 Claims, 15 Drawing Sheets

(51) Int. Cl.
*H01F 27/24* (2006.01)
*H01F 27/28* (2006.01)
*H01F 27/29* (2006.01)
*H01G 4/228* (2006.01)
*H01G 4/30* (2006.01)
*H01G 4/40* (2006.01)
*H01G 4/005* (2006.01)

(52) U.S. Cl.
CPC ............ *H01F 27/292* (2013.01); *H01G 4/224* (2013.01); *H01G 4/228* (2013.01); *H01G 4/30* (2013.01); *H01G 4/40* (2013.01); *H01F 2027/2809* (2013.01); *H01G 4/005* (2013.01)

(56) References Cited

U.S. PATENT DOCUMENTS 9,449,944 B2 * 9/2016 Sawada .................. H01L 33/54
2010/0155925 A1 * 6/2010 Kunimoto ............. H01L 21/561
  257/690
2015/0214129 A1 * 7/2015 Kawakita ................ H01L 24/97
  257/98
2016/0042872 A1 * 2/2016 Choi .................... H01F 17/0013
  361/270

FOREIGN PATENT DOCUMENTS

| JP | H02-016611 A | 1/1990 |
| JP | H11-040459 A | 2/1999 |
| JP | H11-214592 A | 8/1999 |
| JP | 2001-332447 A | 11/2001 |
| JP | 2003-007367 A | 1/2003 |
| JP | 2006-304080 A | 11/2006 |
| JP | 2008-130694 A | 6/2008 |
| JP | 2009-123726 A | 6/2009 |
| JP | 2015-035568 A | 2/2015 |

* cited by examiner

COMPOSITE ELECTRONIC COMPONENT AND MANUFACTURING METHOD FOR SAME

CROSS REFERENCE TO RELATED APPLICATIONS

This application claims benefit of priority to Japanese Patent Application 2016-207135 filed Oct. 21, 2016, the entire content of which is incorporated herein by reference.

TECHNICAL FIELD

The present disclosure relates to a composite electronic component and a manufacturing method for a composite electronic component.

BACKGROUND

An example of a composite electronic component of the related art is disclosed in Japanese Unexamined Patent Application Publication No. 2008-130694. This composite electronic component includes a substrate, a coil element that is arranged on one surface of the substrate, and a capacitance element that is arranged on another surface of the substrate. A first surface of the coil element is arranged on the one surface of the substrate, and a first surface of the capacitance element is arranged on the other surface of the substrate. When the composite electronic component is to be mounted on a mounting substrate, connection terminals are provided on the second surface of the capacitance element on the opposite side from the first surface, and the connection terminals are connected to the mounting substrate.

In the composite electronic component of the related art, the substrate has to be provided in order to integrate the coil element and the capacitance element with each other, and therefore the composite electronic component cannot be reduced in size. In addition, when the composite electronic component is to be mounted on a mounting substrate, connection terminals have to be provided on the second surface of the capacitance element, and this takes time and labor for the work involved.

SUMMARY

Accordingly, a problem to be solved by the present disclosure is to provide a composite electronic component that can realize a reduction in size and that can reduce the amount of time and labor involved when mounting the composite electronic component on a mounting substrate, and to provide a method of manufacturing the composite electronic component.

In order to solve the above-described problem, a composite electronic component according to a preferred embodiment of the present disclosure includes:

a first electronic component that includes a first element body, a first functional element that is provided inside the first element body, and first outer electrodes that are provided on one surface of the first element body and are electrically connected to the first functional element;

a second electronic component that includes a second element body, a second functional element that is provided inside the second element body, and second outer electrodes that are provided on one surface of the second element body and are electrically connected to the second functional element; and a resin body in which the first electronic component and the second electronic component are buried so as to be integrated with each other such that the first outer electrodes and the second outer electrodes are exposed from the resin body.

In the composite electronic component according to the preferred embodiment of the present disclosure, the first electronic component and the second electronic component can be modularized using the resin body even though a substrate for integrating the first electronic component and the second electronic component with each other is not provided, and a reduction in size can be achieved.

In addition, when the modularized first electronic component and second electronic component are to be mounted on a mounting substrate, the first outer electrodes and the second outer electrodes that are exposed from the resin body can be used as connection terminals for connecting the first and second electronic components to the mounting substrate. Thus, there is no need to separately provide connection terminals for connecting the electronic components to the mounting substrate, and the amount of time and labor involved when mounting the electronic components on a mounting substrate can be reduced.

Furthermore, in the composite electronic component according to the preferred embodiment of the present disclosure, the first outer electrodes and the second outer electrodes may be exposed from one surface of the resin body.

With this configuration, the first outer electrodes and the second outer electrodes are exposed from one surface of the resin body, and therefore the one surface of the resin body can be used as a mounting surface.

Furthermore, in the composite electronic component according to the preferred embodiment of the present disclosure, a spacer may be provided between the first electronic component and the second electronic component.

With this configuration, it can be ensured via the spacer that the distance between the first electronic component and the second electronic component is constant.

Furthermore, in the composite electronic component according to the preferred embodiment of the present disclosure, the first electronic component and the second electronic component may contact each other.

With this configuration, the first electronic component and the second electronic component can be arranged without providing a gap between the first electronic component and the second electronic component, and the composite electronic component can be reduced in size.

In addition, in the composite electronic component according to the preferred embodiment of the present disclosure, the one surface of the first element body and the one surface of the second element body may be located in the same plane, and a shortest distance between the first outer electrodes and the second outer electrodes may be around 50-80 μm.

With this configuration, the first outer electrodes and the second outer electrodes can be prevented from contacting each other even though the first electronic component and the second electronic component are made to contact each other.

In addition, the composite electronic component according to the preferred embodiment of the present disclosure may further include:

a third electronic component that is electrically connected to the first electronic component and the second electronic component; and the third electronic component may be arranged on another surface of the first element body that is on the opposite side from the one surface of the first element body and on another surface of the second element body that is on the opposite side from the one surface of the second element body.

With this configuration, since the third electronic component is arranged on the other surface of the first element body and the other surface of the second element body, when the one surface of the first element body and the one surface of the second element body are used as a mounting surface, the third electronic component can be added without increasing the mounting surface area of the composite electronic component.

Furthermore, in the composite electronic component according to the preferred embodiment of the present disclosure, the first functional element and the second functional element may each include at least any one of an inductor element, an impedance element, a capacitor element, a resistor element and an ESD element.

Furthermore, in the composite electronic component according to the preferred embodiment of the present disclosure, the first electronic component and the second electronic component may each be any one of a multilayer-type capacitor component, a multilayer-type inductor component and a winding-type inductor component.

In addition, in the composite electronic component according to the preferred embodiment of the present disclosure, the first element body and the second element body may each be a dielectric body or a magnetic body.

Furthermore, in the composite electronic component according to the preferred embodiment of the present disclosure, the resin body may include a magnetic powder.

In addition, in a composite electronic component manufacturing method according to a preferred embodiment of the present disclosure that is for manufacturing the composite electronic component described above, the first electronic component and the second electronic component are aligned, and the first electronic component and the second electronic component are then buried in the resin body so as to be integrated with each other such that the first outer electrodes and the second outer electrodes are exposed from the resin body.

In this case, the first electronic component and the second electronic component can be modularized using the resin body even though a substrate for integrating the first electronic component and the second electronic component with each other is not provided, and a reduction in size can be achieved.

In addition, when the modularized first electronic component and second electronic component are to be mounted on a mounting substrate, the first outer electrodes and the second outer electrodes that are exposed from the resin body can be used as connection terminals for connecting the first and second electronic components to the mounting substrate. Thus, there is no need to separately provide connection terminals for connecting the electronic components to a mounting substrate, and the amount of time and labor involved when mounting the electronic components on a mounting substrate can be reduced.

Furthermore, in the composite electronic component manufacturing method according to the preferred embodiment of the present disclosure, the first electronic component and the second electronic component may be aligned such that the one surface of the first element body and the one surface of the second element body are located in the same plane.

In this case, the first outer electrodes that are provided on the one surface of the first element body and the second outer electrodes that are provided on the one surface of the second element body can be exposed from one surface of the resin body and the one surface of the resin body can be used as a mounting surface.

In addition, the composite electronic component manufacturing method according to the preferred embodiment of the present disclosure includes:

a step of aligning the first electronic component and the second electronic component such that the one surface of the first element body and the one surface of the second element body face a base; and a step of arranging a resin sheet on another surface of the first element body that is on the opposite side from the one surface of the first element body and on another surface of the second element body that is on the opposite side from the one surface of the second element body, heating and pressurizing the resin sheet, and thereby burying in the resin sheet the entirety of the first element body in a height direction from the other surface of the first element body to the one surface of the first element body and the entirety of the second element body in the height direction from the other surface of the second element body to the one surface of the second element body.

In this case, the first electronic component and the second electronic component are aligned and then the first electronic component and the second electronic component are buried in the resin sheet, and therefore, the first electronic component and the second electronic component can be accurately arranged. The first electronic component and the second electronic component can be buried in the resin sheet at the same time.

In addition, the composite electronic component manufacturing method according to the preferred embodiment of the present disclosure may include:

a step of aligning the first electronic component and the second electronic component such that the one surface of the first element body and the one surface of the second element body face a base;

a step of arranging a first resin sheet on another surface of the first element body that is on the opposite side from the one surface of the first element body and on another surface of the second element body that is on the opposite side from the one surface of the second element body, heating and pressurizing the first resin sheet, and thereby burying in the first resin sheet a portion of the first element body up to a point partway between the other surface and the one surface of the first element body in the height direction and a portion of the second element body up to a point partway between the other surface and the one surface of the second element body in the height direction; and a step of arranging a second resin sheet on the one surface of the first element body and on the one surface of the second element body, heating and pressurizing the second resin sheet, and thereby burying in the second resin sheet a portion of the first element body up to a point partway between the one surface and the other surface of the first element body in the height direction and a portion of the second element body up to a point partway between the one surface and the other surface of the second element body in the height direction.

In this case, the first electronic component and the second electronic component are aligned, and then the first electronic component and the second electronic component are buried in the first and second resin sheets, and therefore, the first electronic component and the second electronic component can be accurately arranged. In addition, since the first electronic component and the second electronic component are buried in the first resin sheet and the second resin sheet in a separate manner, the first electronic component and the second electronic component can be buried with certainty.

In addition, the composite electronic component manufacturing method according to the preferred embodiment of the present disclosure may include:

a step of aligning the first electronic component such that another surface of the first element body that is on the opposite side from the one surface of the first element body faces a base;

a step of arranging a first resin sheet on the one surface of the first element body, heating and pressurizing the first resin sheet, and thereby burying in the first resin sheet a portion of the first element body up to a point partway between the one surface and the other surface of the first element body in the height direction;

a step of aligning the second electronic component such that another surface of the second element body that is on the opposite side from the one surface of the second element body faces a base;

a step of arranging the first resin sheet on the one surface of the second element body, heating and pressurizing the first resin sheet, and thereby burying in the first resin sheet a portion of the second element body up to a point partway between the one surface and the other surface of the second element body in the height direction; and a step of arranging a second resin sheet on the other surface of the first element body and on the other surface of the second element body, heating and pressurizing the second resin sheet, and thereby burying in the second resin sheet a portion of the first element body up to a point partway between the other surface and the one surface of the first element body in the height direction and a portion of the second element body up to a point partway between the other surface and the one surface of the second element body in the height direction.

In this case, the first electronic component and the second electronic component are separately aligned, and then the first electronic component and the second electronic component are buried in the first and second resin sheets, and therefore, the first electronic component and the second electronic component can be accurately arranged. In addition, since the first electronic component and the second electronic component are buried in the first resin sheet and the second resin sheet in a separate manner, the first electronic component and the second electronic component can be buried with certainty.

Furthermore, the composite electronic component manufacturing method according to the preferred embodiment of the present disclosure may include: a step of exposing the first outer electrodes and the second outer electrodes from the second resin sheet.

In this case, even if the first outer electrodes and the second outer electrodes are covered by the second resin sheet, the first outer electrodes and the second outer electrodes can be exposed from the second resin sheet.

In addition, in the composite electronic component manufacturing method according to the preferred embodiment of the present disclosure, in the exposing step, the first outer electrodes and the second outer electrodes may be exposed from the second resin sheet by removing part of the second resin sheet that covers the first outer electrodes and the second outer electrodes with a laser.

In this case, the first outer electrodes and the second outer electrodes can be exposed from the second resin sheet with certainty.

In addition, the composite electronic component manufacturing method according to the preferred embodiment may include:

a step of aligning and burying inside a resin sheet a plurality of the first electronic components and a plurality of the second electronic components; and a step of cutting and dividing the resin sheet into pieces that each correspond to a set of the first electronic component and the second electronic component constituting a single composite electronic component.

In this case, a plurality of composite electronic components can be collectively manufactured in a batch.

In addition, the composite electronic component manufacturing method according to the preferred embodiment may include: a step of providing a spacer between the first electronic component and the second electronic component, and fixing the first electronic component and the second electronic component to the spacer.

In this case, it can be ensured via the spacer that the distance between the first electronic component and the second electronic component is constant.

In addition, in the composite electronic component manufacturing method according to the preferred embodiment, the spacer may be substantially belt shaped, and a plurality of the first electronic components and a plurality of the second electronic components may be fixed to the belt-shaped spacer.

In this case, a plurality of the first electronic components and a plurality of the second electronic components can be collectively fixed in a batch via the belt-shaped spacer.

In addition, in the composite electronic component manufacturing method according to the preferred embodiment of the present disclosure, the belt-shaped spacer may be bent in a substantially meandering shape.

In this case, since the belt-shaped spacer is bent in a meandering shape, a plurality of the first electronic components and a plurality of the second electronic components can be fixed to the belt-shaped spacer in a small space.

With the composite electronic component and the composite electronic component manufacturing method according to the preferred embodiments of the present disclosure described above, a reduction in the size of the composite electronic component can be achieved and the amount of time and labor involved when mounting the composite electronic component on a mounting substrate can be reduced.

Other features, elements, characteristics and advantages of the present disclosure will become more apparent from the following detailed description of preferred embodiments of the present disclosure with reference to the attached drawings.

DETAILED DESCRIPTION

Hereafter, the present disclosure will be described in more detail in illustrative embodiments.

First Embodiment

Figure 1:
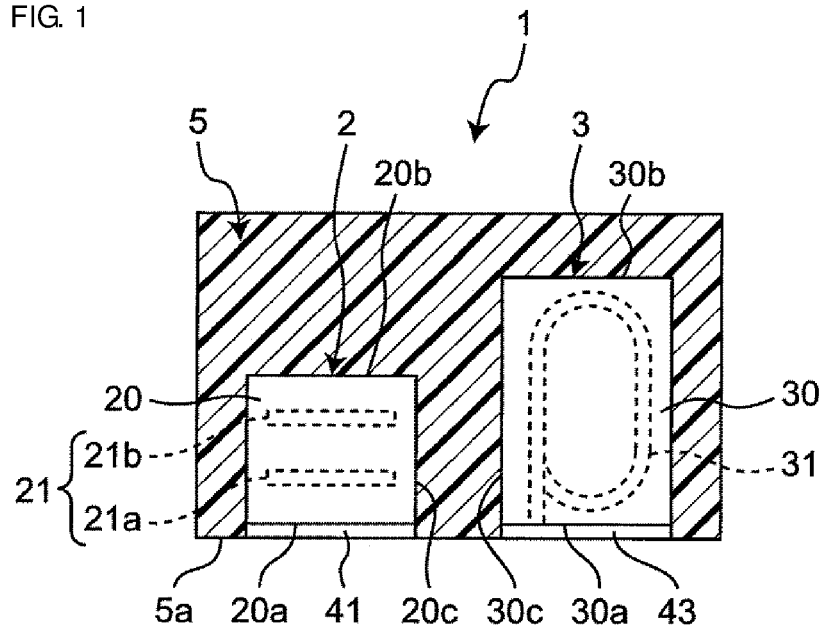
FIG. 1 is a vertical sectional view illustrating a composite electronic component according to a first embodiment of the present disclosure.
Figure 2:
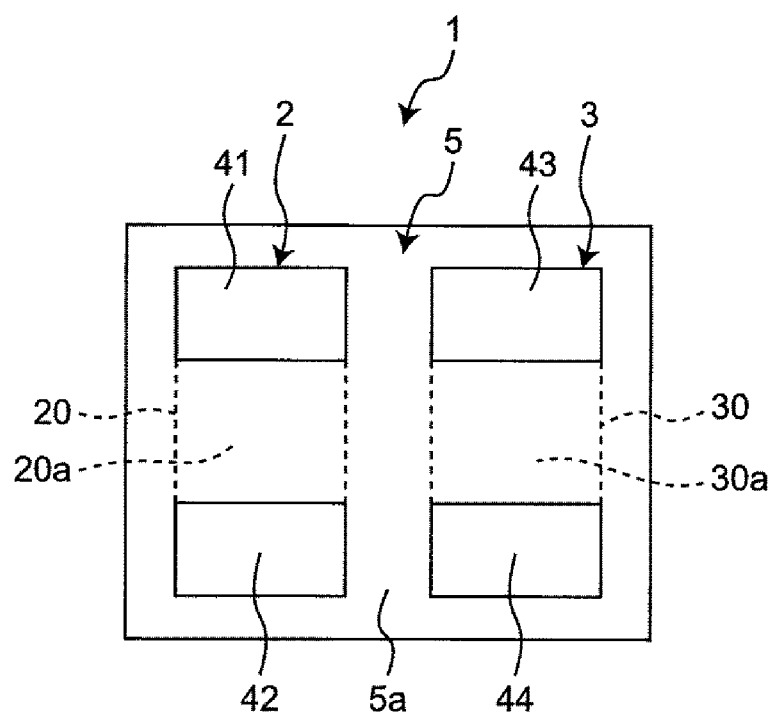
FIG. 2 is a bottom view of the composite electronic component according to the first embodiment of the present disclosure.

FIG. 1 is a vertical sectional view illustrating a composite electronic component according to a first embodiment of the present disclosure. FIG. 2 is a bottom view of a composite electronic component 1. As illustrated in FIGS. 1 and 2, the composite electronic component 1 includes a capacitor component 2, an inductor component 3, and a resin body 5 in which the capacitor component 2 and the inductor component 3 are buried so as to be integrated with each other. The capacitor component 2 and the inductor component 3 are electrically connected to each other and thereby form an LC filter. The capacitor component 2 is an example of a first electronic component of this embodiment. The inductor component 3 is an example of a second electronic component of this embodiment.

The capacitor component 2 includes a capacitor element body 20, a capacitor element 21 that is provided inside the capacitor element body 20, and a first input outer electrode 41 and a first output outer electrode 42 that are provided on the capacitor element body 20 and are electrically connected to the capacitor element 21. The capacitor element body 20 is an example of a first element body of this embodiment. The capacitor element 21 is an example of a first functional element of this embodiment. The first input outer electrode 41 and the first output outer electrode 42 are an example of first outer electrodes of this embodiment.

The capacitor element body 20 has a first surface 20a, a second surface 20b that is on the opposite side from the first surface 20a, and a third surface 20c that connects the first surface 20a and the second surface 20b to each other. In more detail, the capacitor element body 20 is a substantially rectangular parallelepiped shaped body, the first surface 20a is a bottom surface, the second surface 20b is a top surface, and the third surface 20c is a side surface. The first surface 20a is an example of one surface of the first element body of this embodiment, and the second surface 20b is an example of another surface of the first element body of this embodiment.

The capacitor element body 20 is a dielectric body, and is formed of a ceramic, for example. The first input outer electrode 41 and the first output outer electrode 42 are provided on the first surface 20a of the capacitor element body 20. The first input outer electrode 41 and the first output outer electrode 42 are arranged so as to be spaced apart from each other on the first surface 20a.

The capacitor element 21 includes a first electrode 21a that is connected to the first input outer electrode 41, and a second electrode 21b that is connected to the first output outer electrode 42. The first electrode 21a and the second electrode 21b are arranged so as to be spaced apart from each other. The capacitor element 21 may instead be formed of three or more electrodes.

The capacitor component 2 is a multilayer-type capacitor component, for example. In other words, a multilayer capacitor component is formed by stacking a plurality of dielectric layers that will form the capacitor element body 20 on top of one another, applying a printing paste that will form the capacitor element 21 to the dielectric layers, performing firing, and then applying the outer electrodes.

The inductor component 3 includes an inductor element body 30, an inductor element 31 that is provided inside the inductor element body 30, and a second input outer electrode 43 and a second output outer electrode 44 that are provided on the inductor element body 30 and are electrically connected to the inductor element 31. The inductor element body 30 is an example of a second element body of this embodiment. The inductor element 31 is an example of a second functional element of this embodiment. The second input outer electrode 43 and the second output outer electrode 44 are an example of second outer electrodes of this embodiment.

The inductor element body 30 has a first surface 30a, a second surface 30b that is on the opposite side from the first surface 30a, and a third surface 30c that connects the first surface 30a and the second surface 30b to each other. In more detail, the inductor element body 30 is a substantially rectangular parallelepiped shaped body, the first surface 30a is a bottom surface, the second surface 30b is a top surface, and the third surface 30c is a side surface. The first surface 30a is an example of one surface of the second element body of this embodiment, and the second surface 30b is an example of another surface of the second element body of this embodiment.

The inductor element body 30 is a magnetic body, and is formed of a ferrite or a composite body composed of a metal magnetic powder and a resin material (or a glass material), for example. The second input outer electrode 43 and the second output outer electrode 44 are provided on the first surface 30a of the inductor element body 30. The second input outer electrode 43 and the second output outer electrode 44 are arranged so as to be spaced apart from each other on the first surface 30a.

The inductor component 3 is a multilayer-type inductor component or a winding-type inductor component, for example. In the case where the inductor component 3 is a multilayer-type inductor component, the multilayer-type inductor component is formed by stacking a plurality of magnetic layers that will form the inductor element body 30 on top of one another, applying a printing paste that will form the inductor element 31 to the magnetic layers, performing firing, and then applying the outer electrodes. In the case where the inductor component 3 is a winding-type inductor component, the winding-type inductor component is formed by covering a winding wire that will form the inductor element 31 with a magnetic material that will form the inductor element body 30.

The first surface 20a of the capacitor element body 20 and the first surface 30a of the inductor element body 30 are located in substantially the same plane. The third surface 20c of the capacitor element body 20 and the third surface 30c of the inductor element body 30 face each other and are separated from each other with a gap therebetween.

The capacitor component 2 and the inductor component 3 are buried inside the resin body 5 so as to be integrated with each other in such a manner that the first input outer electrode and the first output outer electrode 42 of the capacitor component 2 and the second input outer electrode 43 and the second output outer electrode 44 of the inductor component 3 are exposed from the resin body 5. In other words, the resin body 5 covers the peripheries of the capacitor component 2 and the inductor component 3 except for the outer electrodes 41 to 44, and is also present in the gap between the third surface 20c of the capacitor element body 20 and the third surface 30c of the inductor element body 30.

The resin body 5 is a substantially rectangular parallelepiped shaped body having a first surface 5a. The first surface 5a is an example of one surface of a resin body of this embodiment. The first input outer electrode 41 and the first output outer electrode 42, and the second input outer electrode 43 and the second output outer electrode 44 are exposed from the first surface 5a of the resin body 5.

The resin body 5 may include a magnetic powder. In more detail, the resin body 5 is formed of a composite body that is composed of a resin material and a magnetic powder. The resin material is epoxy resin, for example, and the magnetic powder is a ferrite powder or a metal magnetic powder, for example.

According to the composite electronic component 1, even though the composite electronic component 1 is not provided with a substrate for integrating the capacitor component 2 and the inductor component 3 with each other, the capacitor component 2 and the inductor component 3 can be modularized by using the resin body 5, and a reduction in size can be achieved.

When the modularized capacitor component 2 and inductor component 3 are to be mounted on a mounting substrate, the outer electrodes 41 to 44 that are exposed from the resin body 5 can be used as connection terminals for connecting the modularized capacitor component 2 and inductor component 3 to the mounting substrate. Thus, there is no need to separately provide connection terminals for connecting the electronic components to a mounting substrate, and the amount of time and labor involved when mounting the electronic components on a mounting substrate can be reduced.

In addition, since the outer electrodes 41 to 44 are exposed from the first surface 5a of the resin body 5, the first surface 5a of the resin body 5 can be used as a mounting surface.

Furthermore, since single components, such as the capacitor component 2 and the inductor component 3 are used, desired filter characteristics can be easily obtained in the same way as in a typical case where electronic components are modularized.

In addition, in the case where the capacitor component 2 needs to have a large capacitance, the capacitor component 2 can be a low-loss capacitor component by using a small-sized large-capacitance capacitor component that employs a low dielectric constant material, and consequently, filter attenuation characteristics can be improved.

Furthermore, since the capacitor element body 20 and the inductor element body 30 do not have be fired at the same time (co-firing), problems such as delamination that occur due to the capacitor element body 20 and the inductor element body 30, which are formed of different materials, being fired at the same time are eliminated, and the composite electronic component 1 having high reliability can be realized.

Next, a method of manufacturing the composite electronic component 1 will be described.

The capacitor component 2 and the inductor component 3 are aligned, and then the capacitor component 2 and the inductor component 3 are buried in the resin body 5 so as to be integrated with each other such that the first outer electrodes 41 and 42 and the second outer electrodes 43 and 44 are exposed from the resin body 5. At this time, the capacitor component 2 and the inductor component 3 are aligned such that the first surface 20a of the capacitor element body 20 and the first surface 30a of the inductor element body 30 are located in the same plane.

Figure 3A:
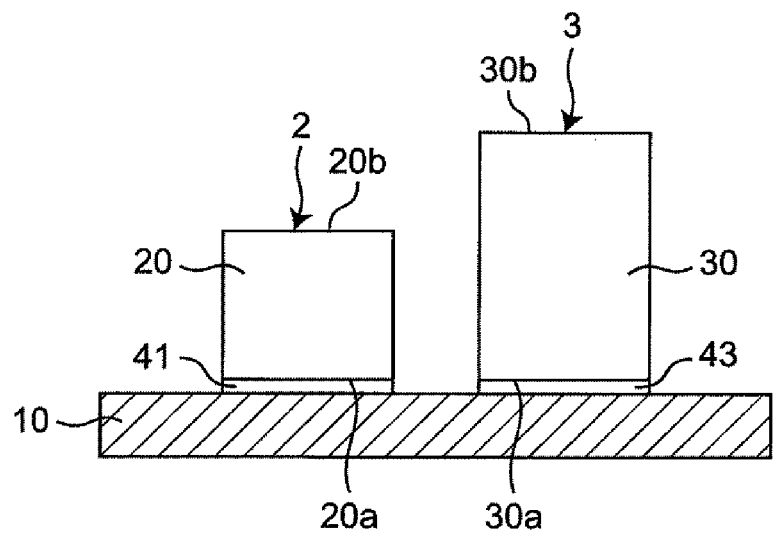
FIG. 3A is an explanatory diagram for explaining a method of manufacturing a composite electronic component according to a first embodiment of the present disclosure.

In more detail, as illustrated in FIG. 3A, the capacitor component 2 and the inductor component 3 are aligned such that the first surface 20a of the capacitor element body 20 and the first surface 30a of the inductor element body 30 face a base 10. At this time, the first outer electrodes 41 and 42 of the capacitor component 2 and the second outer electrodes 43 and 44 of the inductor component 3 contact the base 10. The base 10 is an adhesive sheet, and the capacitor component 2 and the inductor component 3 are adhered to the adhesive sheet. When aligning the capacitor component 2 and the inductor component 3 on the base 10, the capacitor component 2 and the inductor component 3 may be aligned using a mounter.

Figure 3B:
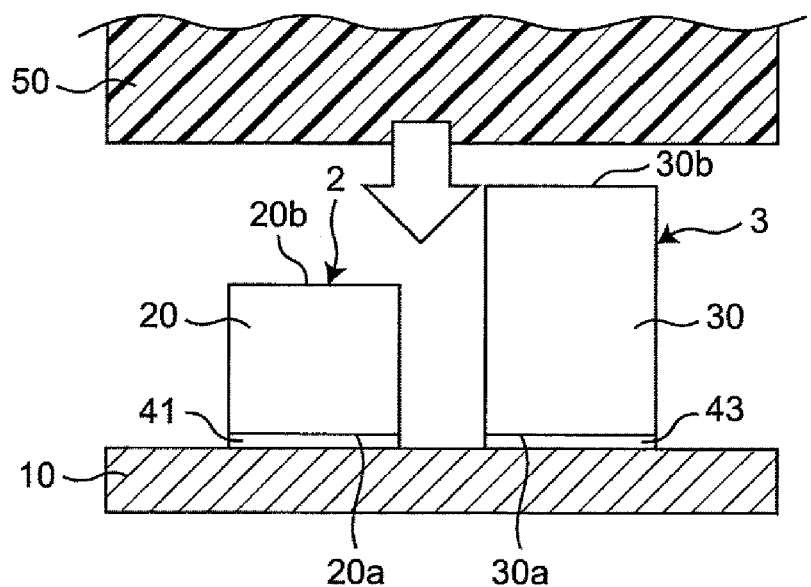
FIG. 3B is an explanatory diagram for explaining the method of manufacturing a composite electronic component according to the first embodiment of the present disclosure.

Then, as illustrated in FIG. 3B, a resin sheet 50 is arranged on the second surface 20b of the capacitor element body and the second surface 30b of the inductor element body 30 and the resin sheet 50 is heated and pressurized. The resin sheet 50 will form the resin body 5, and therefore is formed of the same material as the resin body 5.

Figure 3C:
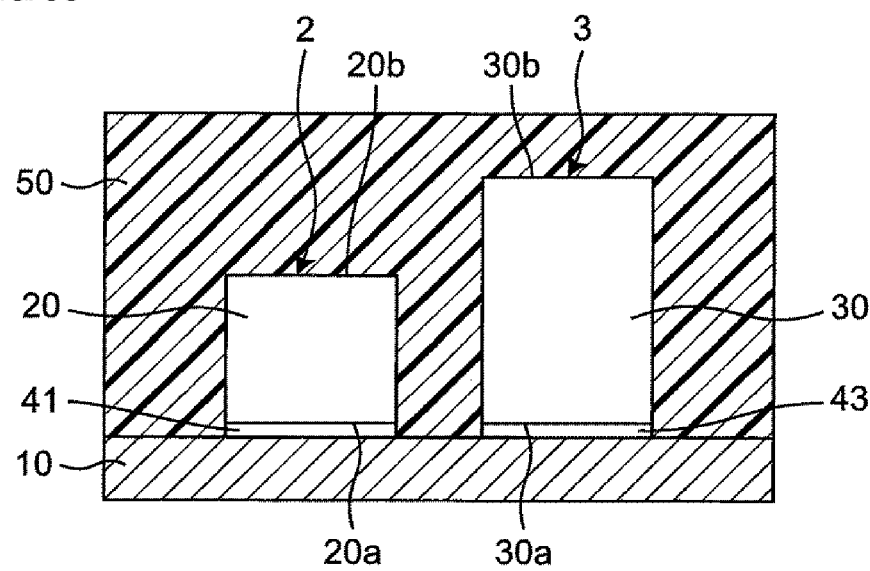
FIG. 3C is an explanatory diagram for explaining the method of manufacturing a composite electronic component according to the first embodiment of the present disclosure.

Then, as illustrated in FIG. 3C, the entirety of the capacitor element body 20 in the height direction from the second surface 20b to the first surface 20a and the entirety of the inductor element body 30 in the height direction from the second surface 30b to the first surface 30a are buried in the resin sheet 50.

Figure 3D:
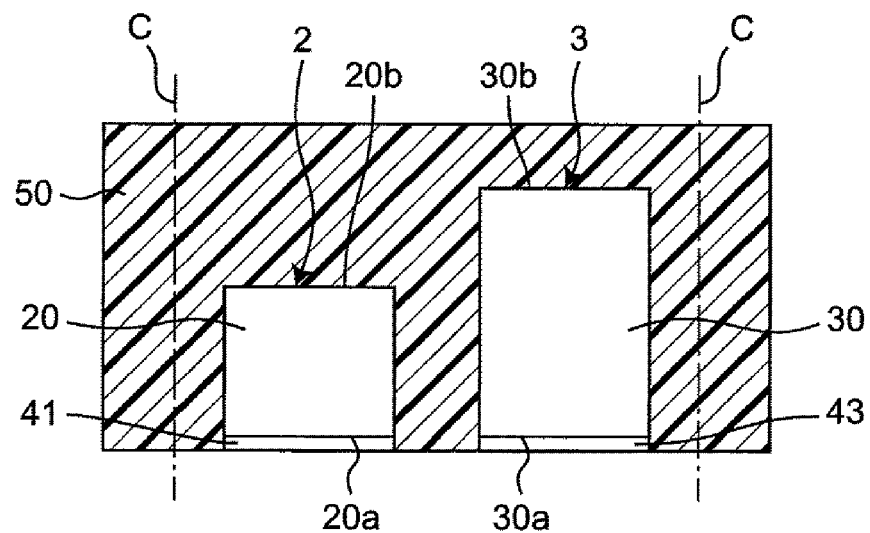
FIG. 3D is an explanatory diagram for explaining the method of manufacturing a composite electronic component according to the first embodiment of the present disclosure.

Then, as illustrated in FIG. 3D, the capacitor component 2 and the inductor component 3, which are buried in the resin sheet 50 so as to be integrated with each other, are removed from the base 10, and cutting is performed along cutting lines C using a dicing saw or a guillotine such that the integrated component comes to have a desired size.

Since the first outer electrodes 41 and 42 of the capacitor component 2 and the second outer electrodes 43 and 44 of the inductor component 3 were in contact with the base 10, the first outer electrodes 41 and 42 and the second outer electrodes 43 and 44 are not covered by the resin sheet 50 when the capacitor component 2 and the inductor component 3 are buried in the resin sheet 50. Therefore, when the capacitor component 2 and the inductor component 3 are removed from the base 10 after being buried, the first outer electrodes 41 and 42 and the second outer electrodes 43 and 44 are exposed from the resin sheet 50.

If there are gaps between the first outer electrodes 41 and 42 and the second outer electrodes 43 and 44, and the base 10, the material of the resin sheet 50 may flow into the gaps and cover the first outer electrodes 41 and 42 and the second outer electrodes 43 and 44 in the step of burying the capacitor component 2 and the inductor component 3 in the resin sheet 50. In such a case, the first outer electrodes 41 and 42 and the second outer electrodes 43 and 44 may be made to be exposed from the resin sheet 50. For example, the first outer electrodes 41 and 42 and the second outer electrodes 43 and 44 may be exposed from the resin sheet 50 by removing the parts of the resin sheet 50 covering the first outer electrodes 41 and 42 and the second outer electrodes 43 and 44 using a laser.

Thus, the composite electronic component 1 illustrated in FIG. 1 is manufactured. Next, an example of the conditions under which the resin sheet 50 is heated and pressurized will be described. When burying the capacitor component 2 and the inductor component 3, the resin sheet 50 is heated to 120° C. and pressurized to 10 MPa, for example. Once the capacitor component 2 and the inductor component 3 have been buried in the resin sheet 50, the resin sheet 50 is thermally cured by being heated to 180° C. and pressurized at 10 MPa, for example. In other words, the resin sheet 50 is composed of a resin having a reaction start temperature that is higher than the burying temperature thereof such that the resin sheet 50 is not cured at the burying temperature. The burying temperature is 120° C. for example, and the reaction start temperature is 150° C. for example. The resin sheet 50 contains a solid polymer resin and a liquid resin.

According to the method of manufacturing the composite electronic component 1, the capacitor component 2 and the inductor component 3 are buried in the resin sheet 50 after aligning the capacitor component 2 and the inductor component 3, and therefore the capacitor component 2 and the inductor component 3 can be arranged with high accuracy. The capacitor component 2 and the inductor component 3 can be buried in the resin sheet 50 at the same time.

Although a single composite electronic component is manufactured in this embodiment, a plurality of composite electronic components may instead be collectively manufactured in a batch. More specifically, a plurality of first electronic components and a plurality of second electronic components may be aligned with one another and then buried in a resin sheet. After that, the resin sheet may be cut and divided into pieces that each correspond to a set of a first electronic component and a second electronic component forming a single composite electronic component. Thus, a plurality of composite electronic components can be collectively manufactured in a batch. The resin sheet may be cut using a guillotine or a dicing saw, for example. In addition, this manufacturing method may also be applied to the embodiments described hereafter.

Second Embodiment

FIGS. 4A to 4F are vertical sectional views illustrating a method of manufacturing a composite electronic component according to a second embodiment of the present disclosure. This embodiment differs from the first embodiment with respect to the step of burying the components in the resin sheet. In the second embodiment, the same symbols as in the first embodiment are used to denote constituent parts that are the same as in the first embodiment, and therefore description of those constituent parts is omitted.

Figure 4A:
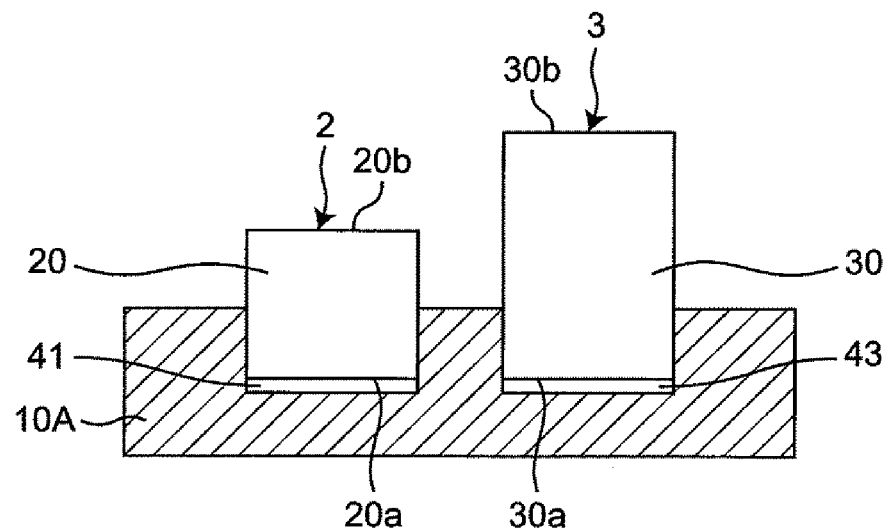
FIG. 4A is an explanatory diagram for explaining a method of manufacturing a composite electronic component according to a second embodiment of the present disclosure.

As illustrated in FIG. 4A, the capacitor component 2 and the inductor component 3 are aligned such that the first surface 20a of the capacitor element body 20 and the first surface 30a of the inductor element body 30 face a base 10A. The base 10A is a jig in which recesses are provided, and the capacitor component 2 and the inductor component 3 are aligned by being fitted into the recesses. In addition, the base 10A may be an adhesive sheet or the like.

Figure 4B:
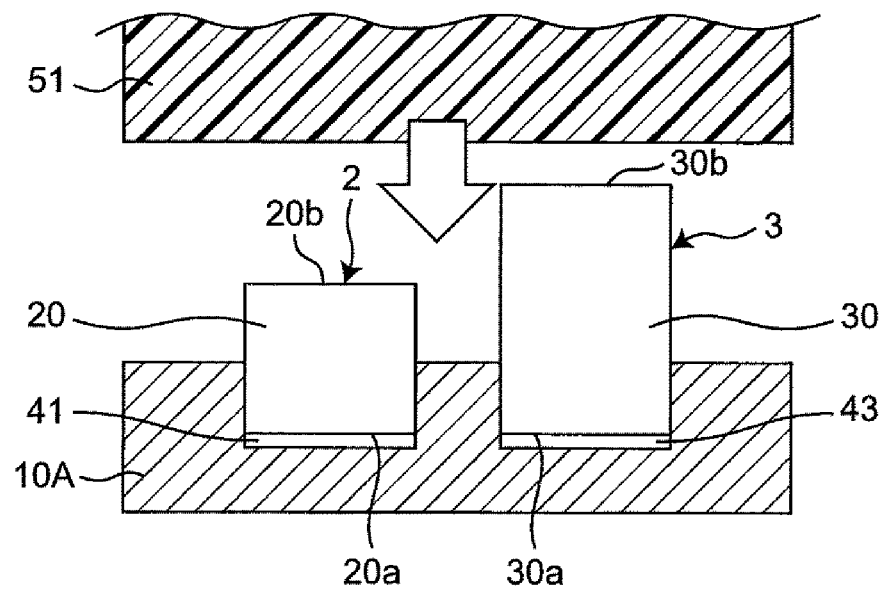
FIG. 4B is an explanatory diagram for explaining the method of manufacturing a composite electronic component according to the second embodiment of the present disclosure.

Then, as illustrated in FIG. 4B, a first resin sheet 51 is arranged on the second surface 20b of the capacitor element body 20 and the second surface 30b of the inductor element body 30, and the first resin sheet 51 is heated and pressurized.

Figure 4C:
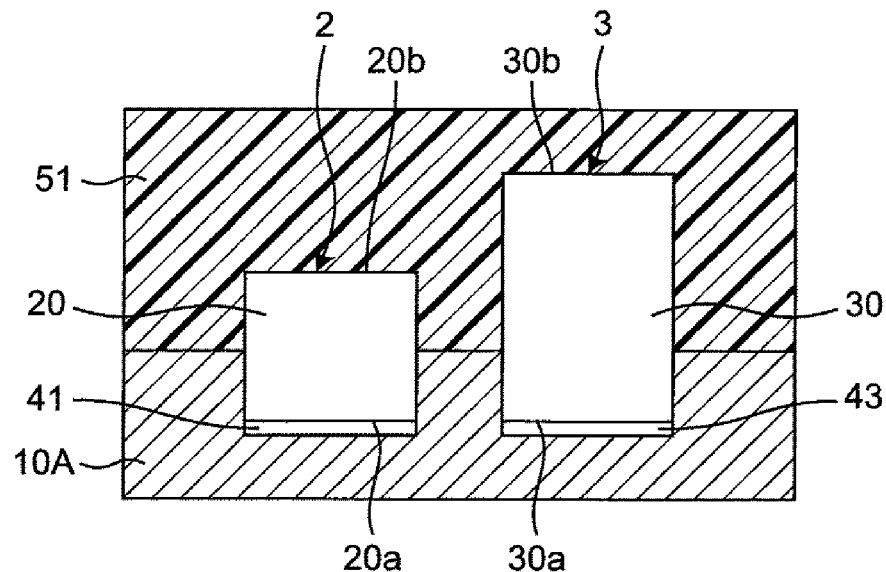
FIG. 4C is an explanatory diagram for explaining the method of manufacturing a composite electronic component according to the second embodiment of the present disclosure.

Then, as illustrated in FIG. 4C, a portion of the capacitor element body 20 up to a point partway between the second surface 20b and the first surface 20a of the capacitor element body 20 in the height direction and a portion of the inductor element body 30 up to a point partway between the second surface 30b and the first surface 30a of the inductor element body 30 in the height direction are buried in the first resin sheet 51.

Figure 4D:
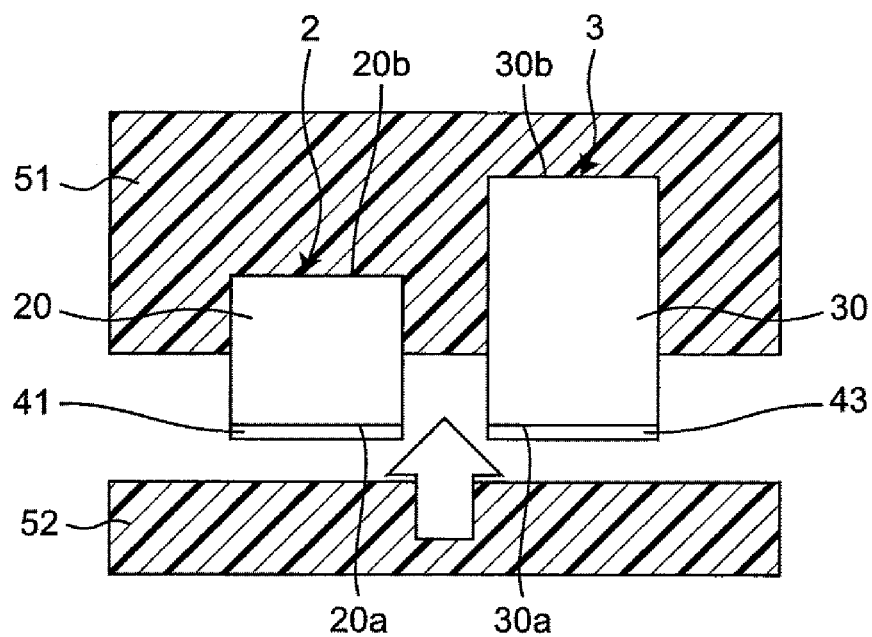
FIG. 4D is an explanatory diagram for explaining the method of manufacturing a composite electronic component according to the second embodiment of the present disclosure.

Then, as illustrated in FIG. 4D, the capacitor component 2 and the inductor component 3, which are buried in the first resin sheet 51 so as to be integrated with each other, are removed from the base 10A, and a second resin sheet 52 is arranged on the first surface 20a of the capacitor element body 20 and the first surface 30a of the inductor element body 30.

Figure 4E:
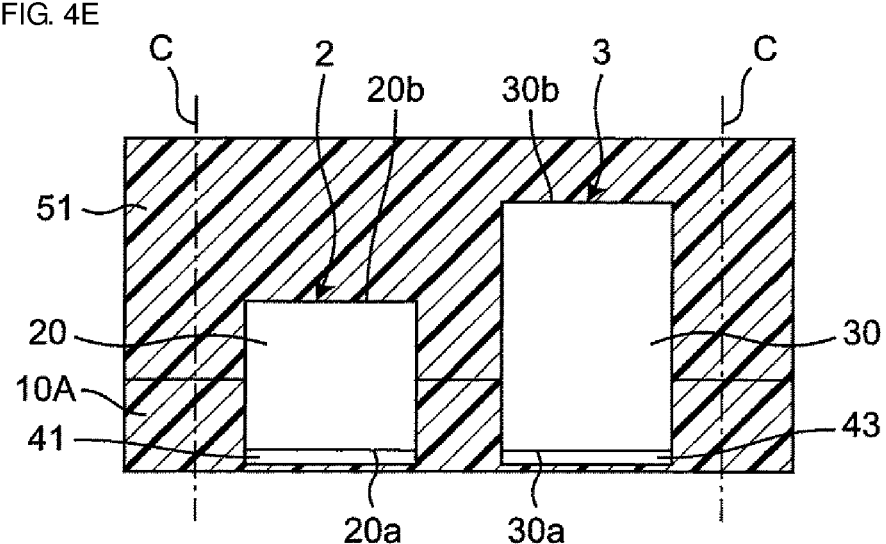
FIG. 4E is an explanatory diagram for explaining the method of manufacturing a composite electronic component according to the second embodiment of the present disclosure.

Then, as illustrated in FIG. 4E, the second resin sheet 52 is heated and pressurized, and as a result, a portion of the capacitor element body 20 up to a point partway between the first surface 20a and the second surface 20b of the capacitor element body 20 in the height direction and a portion of the inductor element body 30 up to a point partway between the first surface 30a and the second surface 30b of the inductor element body 30 in the height direction are buried in the second resin sheet 52. Thus, the capacitor component 2 and the inductor component 3 are buried in the first and second resin sheets 51 and 52. The first and second resin sheets 51 and 52 are composed of the same material as the resin sheet 50 in the first embodiment, and form the resin body 5. After that, the composite electronic component is cut along the cutting lines C using a guillotine or a dicing saw so that the composite electronic component comes to have the desired size.

Figure 4F:
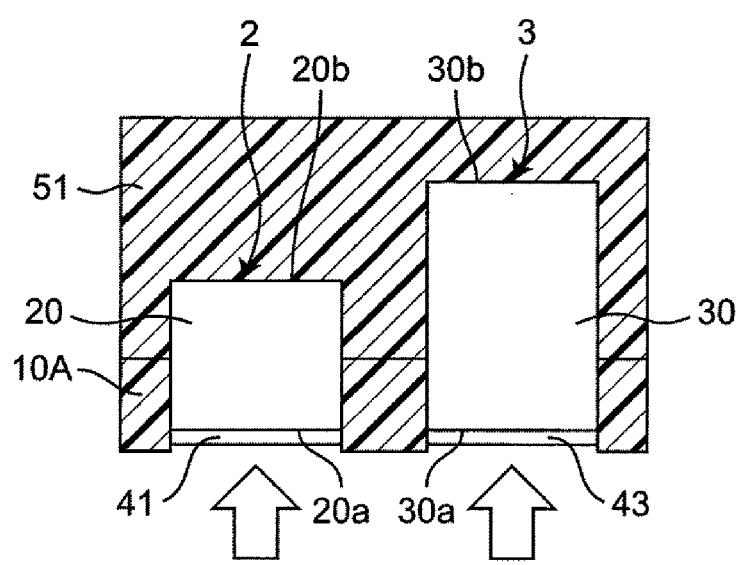
FIG. 4F is an explanatory diagram for explaining the method of manufacturing a composite electronic component according to the second embodiment of the present disclosure.

Then, as illustrated in FIG. 4F, the first outer electrodes 41 and 42 and the second outer electrodes 43 and 44 are made to be exposed from the second resin sheet 52. More specifically, the portions of the second resin sheet 52 covering the first outer electrodes 41 and 42 and the second outer electrodes 43 and 44 are removed using a laser as indicated by the arrows, and the first outer electrodes 41 and 42 and the second outer electrodes 43 and 44 are thereby exposed from the second resin sheet 52. Thus, the first outer electrodes 41 and and the second outer electrodes 43 and 44 are exposed with certainty from the second resin sheet 52.

In addition, if the first outer electrodes 41 and 42 and the second outer electrodes 43 and 44 are not covered by the second resin sheet 52 when the capacitor component 2 and the inductor component 3 are buried in the second resin sheet 52, there is no need to perform the exposing step after burying the capacitor component 2 and the inductor component 3 in the second resin sheet 52.

According to the second embodiment, the capacitor component 2 and the inductor component 3 are buried in the first and second resin sheets 51 and 52 after aligning the capacitor component 2 and the inductor component 3, and therefore, the capacitor component 2 and the inductor component 3 can be arranged with high accuracy. Furthermore, since the capacitor component 2 and the inductor component 3 are buried in the first resin sheet 51 and buried in the second resin sheet 52 in a separate manner, the capacitor component 2 and the inductor component 3 can be buried with certainty.

Third Embodiment

FIGS. 5A to 5J are vertical sectional views illustrating a method of manufacturing a composite electronic component according to a third embodiment of the present disclosure. This embodiment differs from the first embodiment with respect to the step of burying the components in the resin sheet. In the third embodiment, the same symbols as in the first embodiment are used to denote constituent parts that are the same as in the first embodiment, and therefore description of those constituent parts is omitted.

Figure 5A:
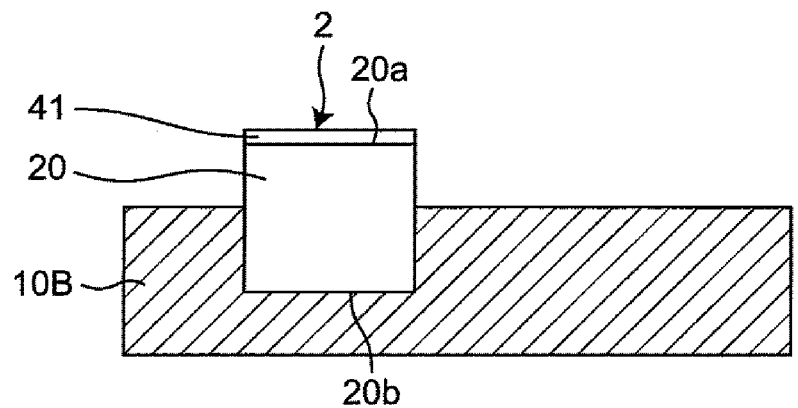
FIG. 5A is an explanatory diagram for explaining a method of manufacturing a composite electronic component according to a third embodiment of the present disclosure.

As illustrated in FIG. 5A, the capacitor component 2 is aligned such that the second surface 20b of the capacitor element body 20 faces a first base 10B. The first base 10B is a jig in which a recess is provided, and the capacitor component 2 is aligned by being fitted into the recess. The first base 10B may be an adhesive sheet or the like.

Figure 5B:
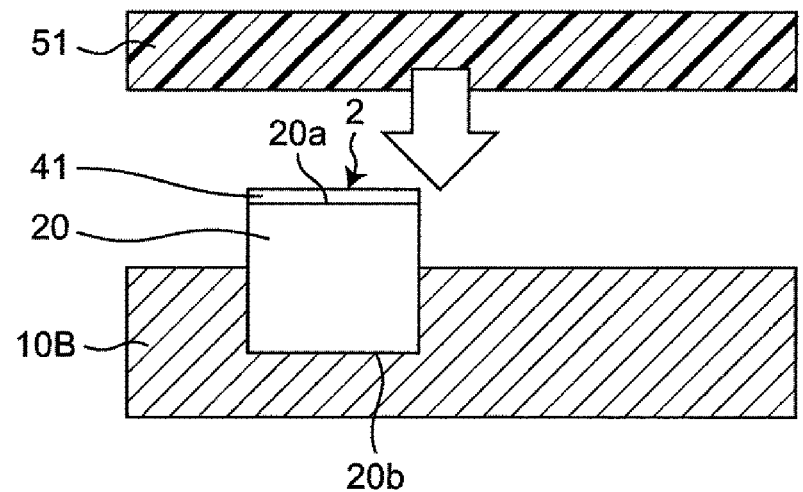
FIG. 5B is an explanatory diagram for explaining the method of manufacturing a composite electronic component according to the third embodiment of the present disclosure.
Figure 5C:
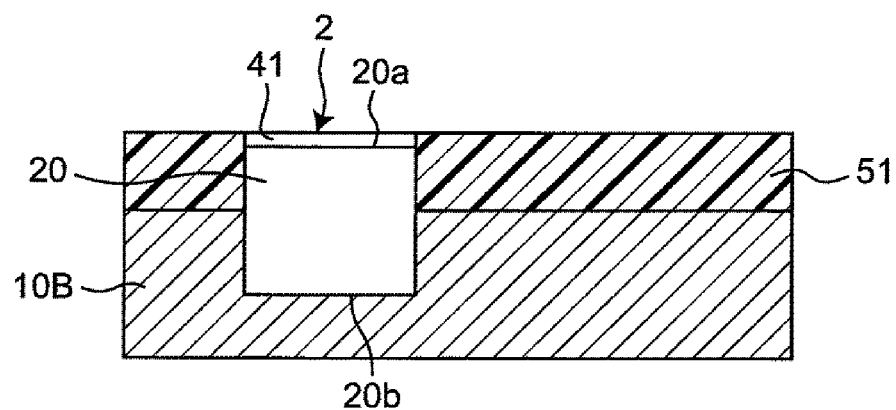
FIG. 5C is an explanatory diagram for explaining the method of manufacturing a composite electronic component according to the third embodiment of the present disclosure.
Figure 5D:
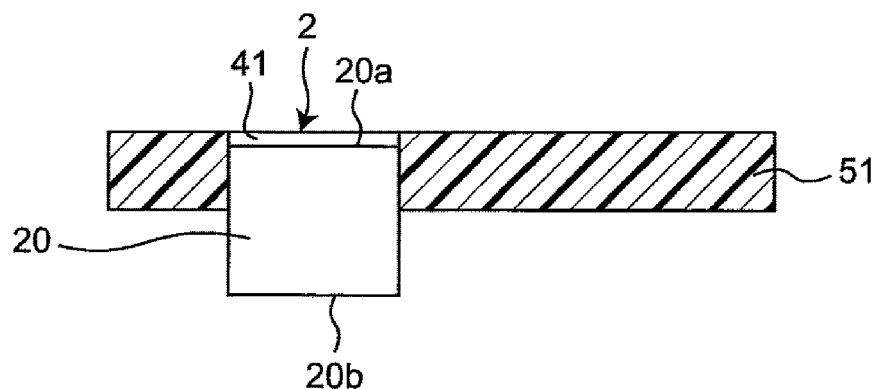
FIG. 5D is an explanatory diagram for explaining the method of manufacturing a composite electronic component according to the third embodiment of the present disclosure.

Then, as illustrated in FIG. 5B, the first resin sheet 51 is arranged on the first surface 20a of the capacitor element body 20, the first resin sheet 51 is heated and pressurized, and as illustrated in FIG. 5C, a portion of the capacitor element body 20 up to a point partway between the first surface 20a and the second surface 20b of the capacitor element body 20 in the height direction is buried in the first resin sheet 51. At this time, the first outer electrodes 41 and 42 are exposed from the first resin sheet 51. After that, as illustrated in FIG. 5D, the capacitor component 2, which is buried so as to be integrated in the first resin sheet 51, is removed from the first base 10B.

Figure 5E:
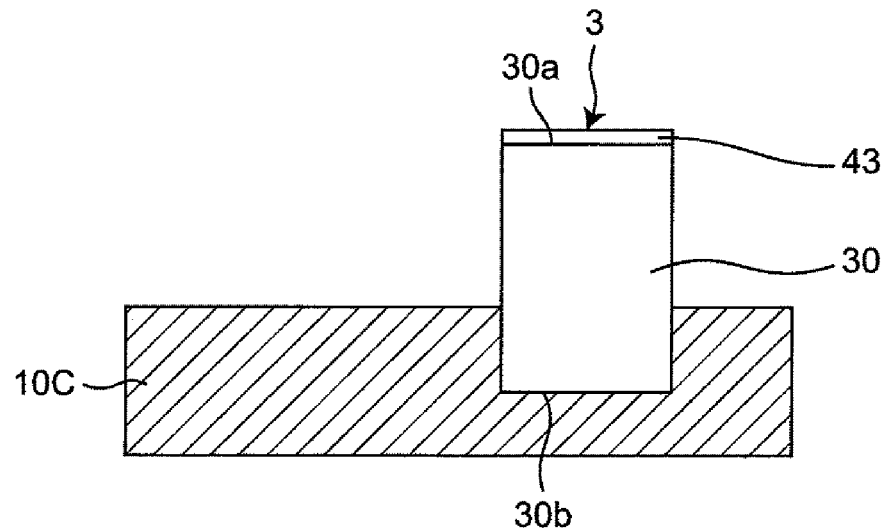
FIG. 5E is an explanatory diagram for explaining the method of manufacturing a composite electronic component according to the third embodiment of the present disclosure.

Then, as illustrated in FIG. 5E, the inductor component is aligned such that the second surface 30b of the inductor element body 30 faces a second base 10C. The second base 10C is a jig in which a recess is provided, and the inductor component 3 is aligned by being fitted into the recess. The second base 10C may be an adhesive sheet or the like.

Figure 5F:
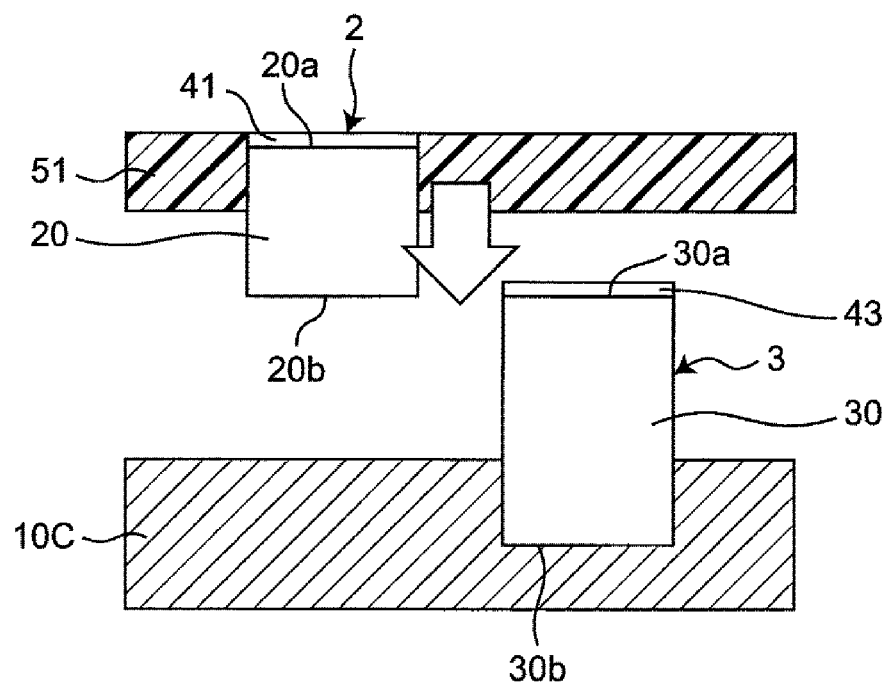
FIG. 5F is an explanatory diagram for explaining the method of manufacturing a composite electronic component according to the third embodiment of the present disclosure.
Figure 5G:
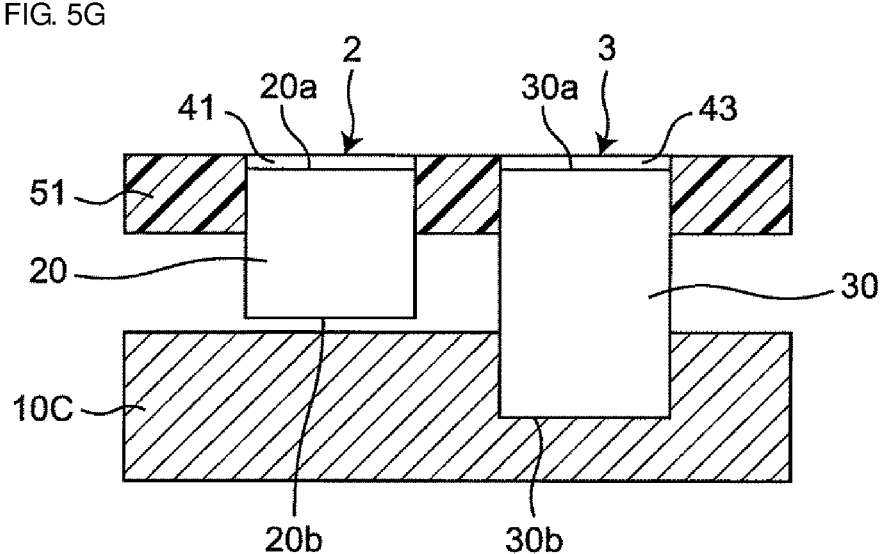
FIG. 5G is an explanatory diagram for explaining the method of manufacturing a composite electronic component according to the third embodiment of the present disclosure.
Figure 5H:
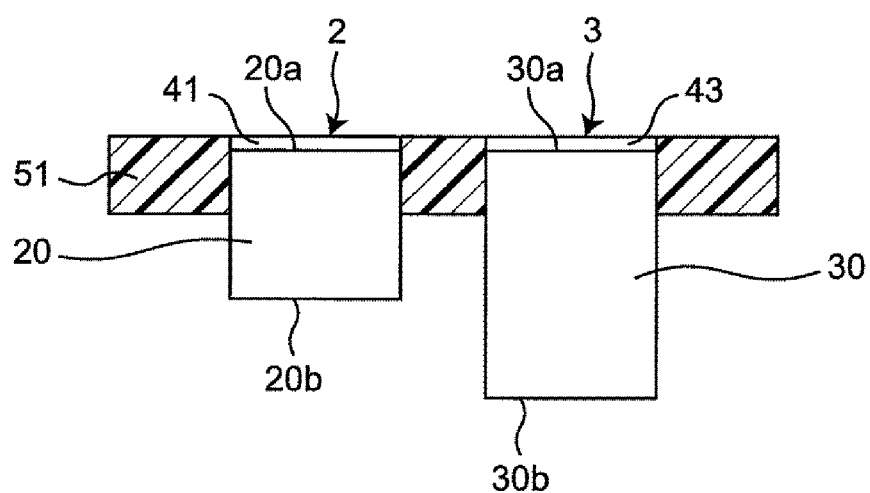
FIG. 5H is an explanatory diagram for explaining the method of manufacturing a composite electronic component according to the third embodiment of the present disclosure.

Then, as illustrated in FIG. 5F, the first resin sheet 51 in which the capacitor component 2 is buried is arranged on the first surface 30a of the inductor element body 30, the first resin sheet 51 is heated and pressurized, and as illustrated in FIG. 5G, a portion of the inductor element body 30 up to a point partway between the first surface 30a and the second surface 30b of the inductor element body 30 in the height direction is buried in the first resin sheet 51. At this time, the second outer electrodes 43 and 44 are exposed from the first resin sheet 51. After that, as illustrated in FIG. 5H, the inductor component 3, which is buried so as to be integrated in the first resin sheet 51, is removed from the second base 10C.

Figure 5I:
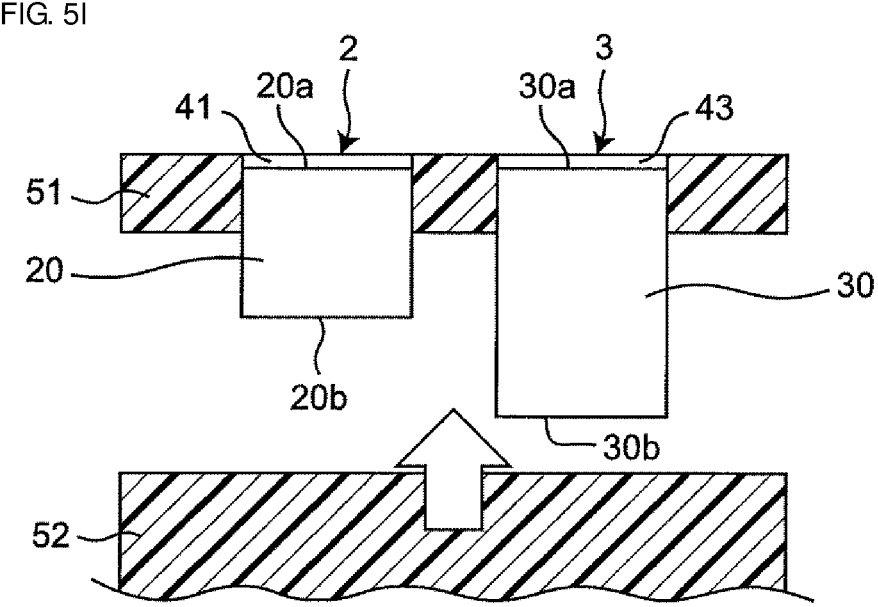
FIG. 5I is an explanatory diagram for explaining the method of manufacturing a composite electronic component according to the third embodiment of the present disclosure.
Figure 5J:
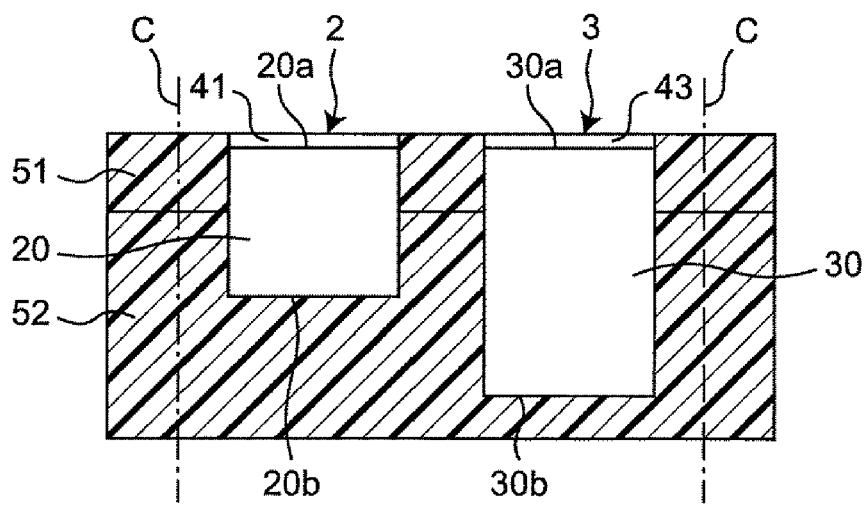
FIG. 5J is an explanatory diagram for explaining the method of manufacturing a composite electronic component according to the third embodiment of the present disclosure.

Then, as illustrated in FIG. 5I, the second resin sheet is arranged on the second surface 20b of the capacitor element body 20 and the second surface 30b of the inductor element body 30. The second resin sheet 52 is heated and pressurized, and as illustrated in FIG. 5J, a portion of the capacitor element body 20 up to a point partway between the second surface 20b and the first surface 20a of the capacitor element body 20 in the height direction and a portion of the inductor element body 30 up to a point partway between the second surface 30b and the first surface 30a of the inductor element body 30 in the height direction are buried in the second resin sheet 52. Thus, the capacitor component 2 and the inductor component 3 are buried in the first and second resin sheets 51 and 52. The first and second resin sheets 51 and 52 are composed of the same material as the resin sheet 50 in the first embodiment, and form the resin body 5. After that, the composite electronic component is cut along the cutting lines C using a guillotine or a dicing saw so that the composite electronic component comes to have the desired size.

If the material of the first resin sheet 51 flows onto the first outer electrodes 41 and 42 and the second outer electrodes 43 and 44 in the burying steps illustrated in FIGS. 5C and 5G, the first outer electrodes 41 and 42 and the second outer electrodes 43 and 44 may be made to be exposed from the first resin sheet 51.

According to the third embodiment, the capacitor component 2 and the inductor component 3 are buried in the first and second resin sheets 51 and 52 after individually aligning the capacitor component 2 and the inductor component 3, and therefore, the capacitor component 2 and the inductor component can be arranged with high accuracy. Furthermore, since the capacitor component 2 and the inductor component 3 are buried in the first resin sheet 51 and the second resin sheet 52 in a separate manner, the capacitor component 2 and the inductor component 3 can be buried with certainty.

Fourth Embodiment

Figure 6:
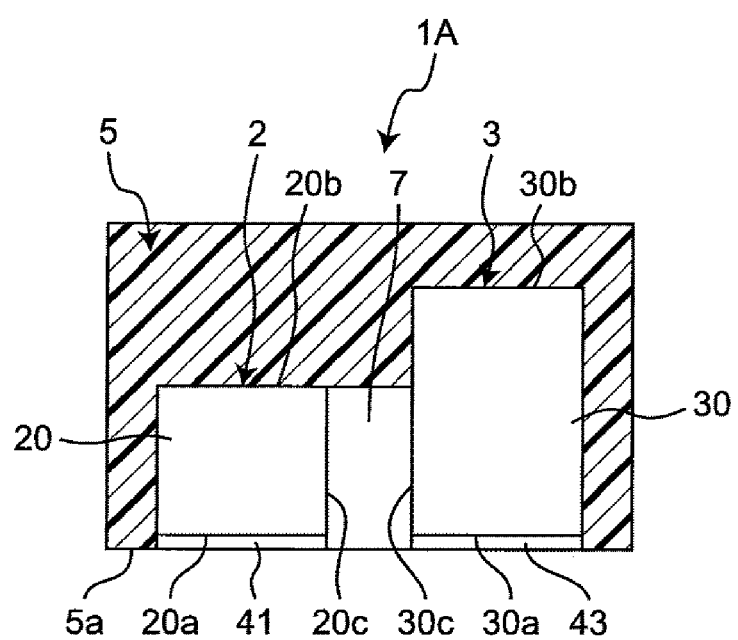
FIG. 6 is a vertical sectional view illustrating a composite electronic component according to a fourth embodiment of the present disclosure.

FIG. 6 is a vertical sectional view illustrating a composite electronic component according to a fourth embodiment of the present disclosure. The configuration of this embodiment differs from that of the first embodiment in that the configuration of this embodiment includes a spacer. In the fourth embodiment, the same symbols as in the first embodiment are used to denote constituent parts that are the same as in the first embodiment, and therefore description of those constituent parts is omitted.

As illustrated in FIG. 6, in a composite electronic component 1A, a spacer 7 is provided between the capacitor component 2 and the inductor component 3. The spacer 7 is formed of a resin, for example. The spacer 7 contacts the third surface 20c of the capacitor element body 20 and the third surface 30c of the inductor element body 30. Thus, it can be ensured via the spacer 7 that the distance between the capacitor component 2 and the inductor component 3 is constant.

Next, a method of manufacturing the composite electronic component 1A will be described.

Figure 7A:
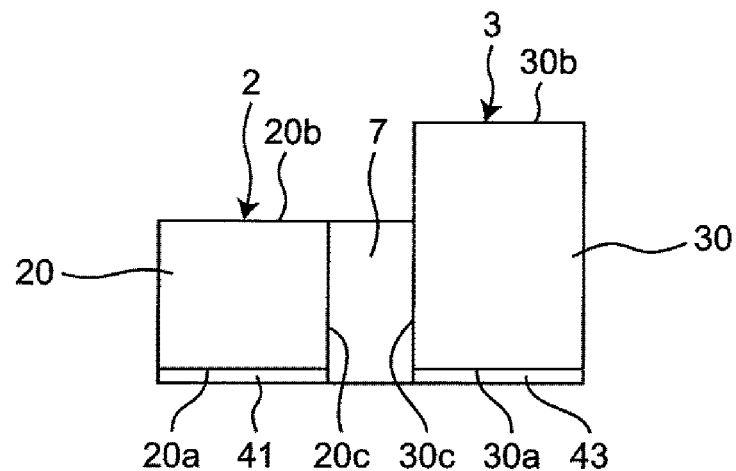
FIG. 7A is an explanatory diagram for explaining a method of manufacturing a composite electronic component according to a fourth embodiment of the present disclosure.

As illustrated in FIG. 7A, the spacer 7 is provided between the capacitor component 2 and the inductor component 3, and the capacitor component 2 and the inductor component 3 are fixed to the spacer 7. At this time, an adhesive may be provided on both surfaces of the spacer 7, the capacitor component 2 may be adhered to one surface of the spacer 7, and the inductor component 3 may be adhered to the other surface of the spacer 7.

Figure 7B:
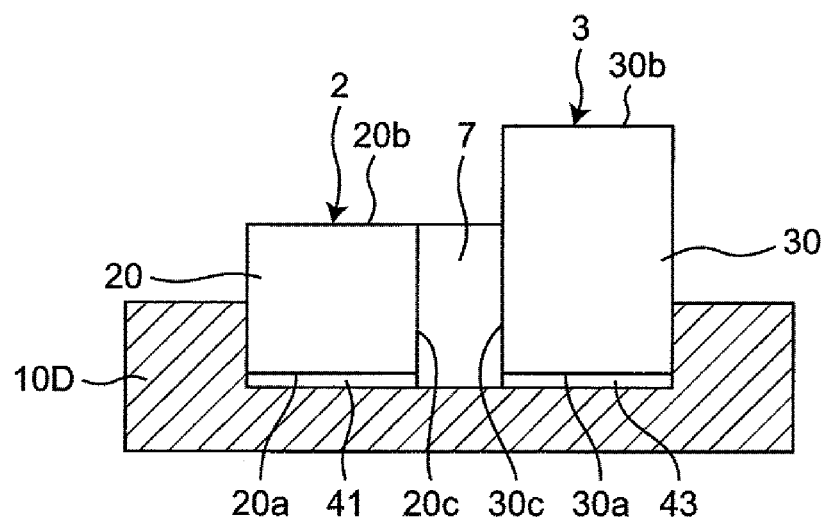
FIG. 7B is an explanatory diagram for explaining the method of manufacturing a composite electronic component according to the fourth embodiment of the present disclosure.

Then, as illustrated in FIG. 7B, the capacitor component 2 and the inductor component 3 are aligned such that the first surface 20a of the capacitor element body 20 and the first surface 30a of the inductor element body 30 face a base 10D. The base 10D is a jig in which a recess is provided, and the capacitor component 2 and the inductor component 3, which are fixed to the spacer 7 so as to be integrated therewith, are aligned by being fitted into the recess. In addition, the base 10D may be an adhesive sheet or the like.

Figure 7C:
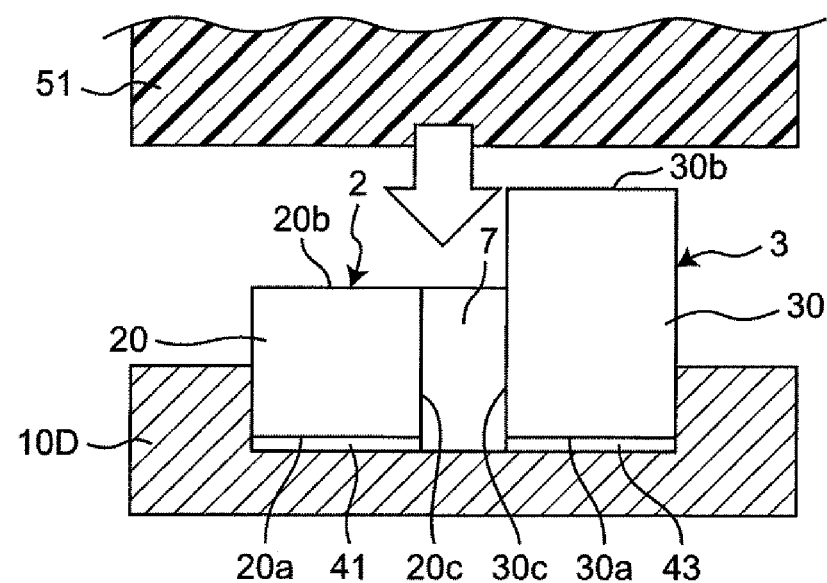
FIG. 7C is an explanatory diagram for explaining the method of manufacturing a composite electronic component according to the fourth embodiment of the present disclosure.

Then, as illustrated in FIG. 7C, the first resin sheet is arranged on the second surface 20b of the capacitor element body 20 and the second surface 30b of the inductor element body 30 and the first resin sheet 51 is heated and pressurized. After that, the capacitor component 2 and the inductor component 3, which are fixed to the spacer 7, are buried in the first and second resin sheets 51 and 52 by performing the steps of the second embodiment illustrated in FIGS. 4C to 4F.

Figure 8:
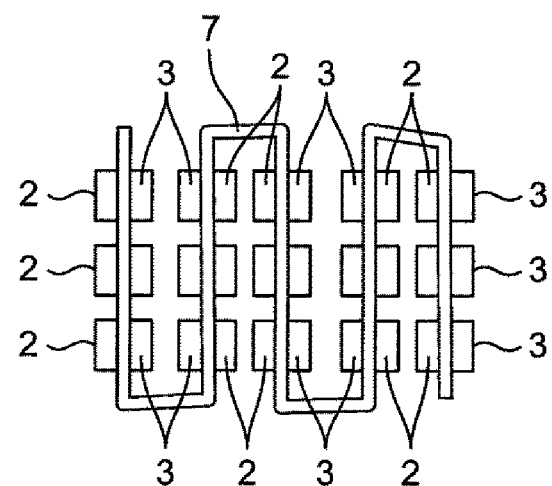
FIG. 8 is an explanatory diagram for explaining the method of manufacturing a composite electronic component according to the fourth embodiment of the present disclosure.

Here, as illustrated in FIG. 8, a configuration may be adopted in which the spacer 7 is substantially belt shaped, and a plurality of capacitor components 2 and a plurality of inductor components 3 are fixed to the belt-shaped spacer 7. Thus, a plurality of capacitor components 2 and a plurality of inductor components 3 can be collectively fixed to one another in a batch via the belt-shaped spacer 7.

More specifically, the belt-shaped spacer 7 is bent in a meandering shape. Thus, a plurality of capacitor components 2 and a plurality of inductor components 3 can be fixed to the belt-shaped spacer 7 in a small space.

Thus, in the case where the belt-shaped spacer 7 is used, a plurality of capacitor components 2 and a plurality of inductor components 3 are buried in the first and second resin sheets 51 and 52 together with the spacer 7, and then composite electronic components 1A of a desired size are obtained by cutting and dividing the spacer 7 into pieces that each correspond to a set of a capacitor component 2 and an inductor component 3. In addition, instead of a meandering shape, the belt-shaped spacer 7 may have a substantially linear shape.

Fifth Embodiment

Figure 9:
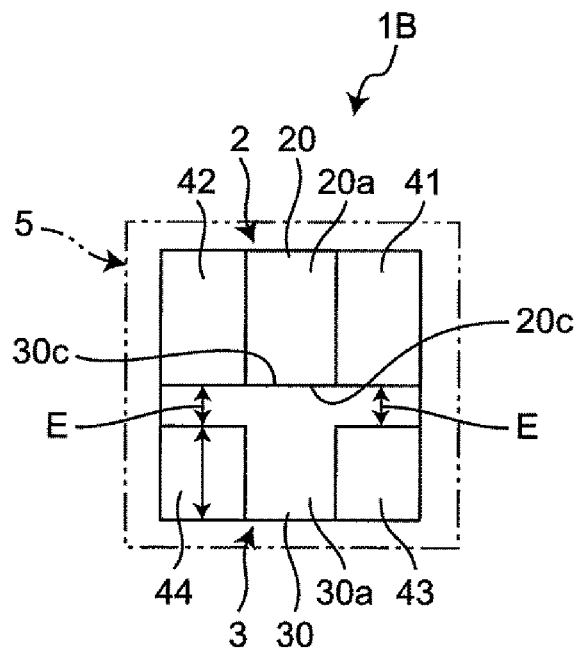
FIG. 9 is a simplified bottom view illustrating a composite electronic component according to a fifth embodiment of the present disclosure.

FIG. 9 is a simplified bottom view illustrating a composite electronic component according to a fifth embodiment of the present disclosure. This embodiment differs from the first embodiment in terms of the positions of the capacitor component and the inductor component. In the fifth embodiment, the same symbols as in the first embodiment are used to denote constituent parts that are the same as in the first embodiment, and therefore description of those constituent parts is omitted.

As illustrated in FIG. 9, in a composite electronic component 1B, the capacitor component 2 and the inductor component 3 are in contact with each other. In other words, the third surface 20c of the capacitor element body 20 and the third surface 30c of the inductor element body 30 contact each other. Therefore, the capacitor component 2 and the inductor component can be arranged without providing a gap therebetween, and a reduction in size can be achieved for the composite electronic component 1B.

In this case, the first surface 20a of the capacitor element body 20 and the first surface 30a of the inductor element body 30 are located in substantially the same plane. The first outer electrodes 41 and 42 and the second outer electrodes 43 and 44 are separated from each other. More specifically, the second outer electrodes 43 and 44 are formed in a biased manner so as to be located on the side opposite from that where the capacitor component 2 is located. More specifically, a shortest distance E between the first input outer electrode 41 and the second input outer electrode 43 is around 50-80 µm. A shortest distance E between the first output outer electrode 42 and the second output outer electrode 44 is around 50-80 µm.

Therefore, it is possible to prevent contact between the first outer electrodes 41 and 42 and the second outer electrodes 43 and 44 even though the capacitor component 2 and the inductor component 3 are in contact with each other. In addition, it is possible to just improve the outer electrodes of an existing product to form the inductor component 3, and to use an existing product for the capacitor component 2.

Sixth Embodiment

Figure 10:
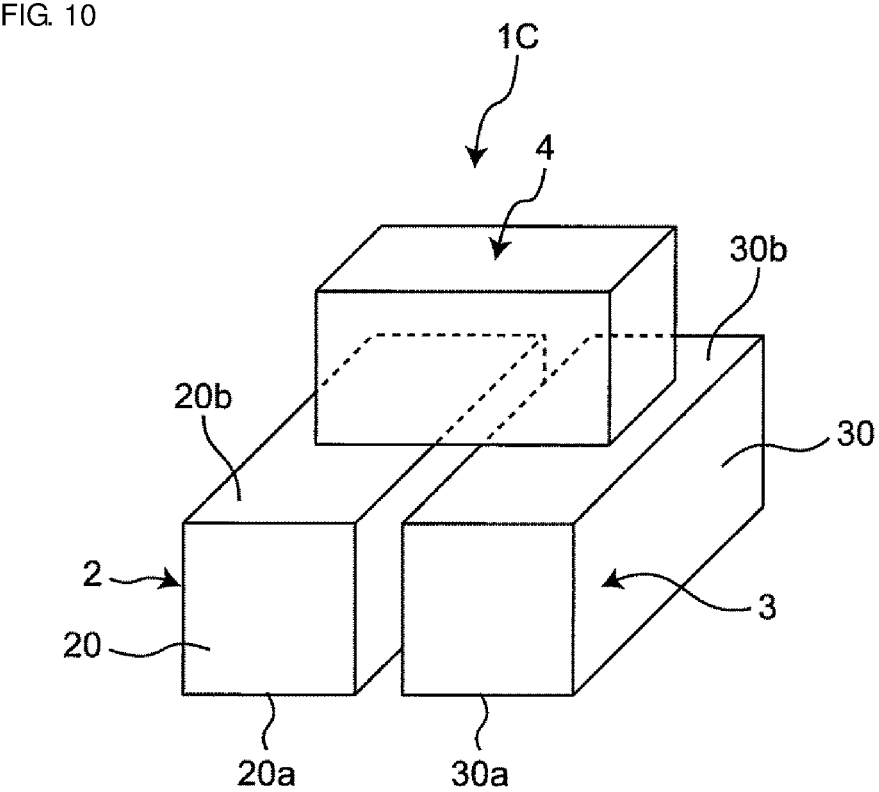
FIG. 10 is a simplified perspective view illustrating a composite electronic component according to a sixth embodiment of the present disclosure.

FIG. 10 is a simplified perspective view illustrating a composite electronic component according to a sixth embodiment of the present disclosure. The configuration of this embodiment differs from that of the first embodiment in that another capacitor component is added. In the sixth embodiment, the same symbols as in the first embodiment are used to denote constituent parts that are the same as in the first embodiment, and therefore description of those constituent parts is omitted.

As illustrated in FIG. 10, a composite electronic component 1C further includes a second capacitor component 4. The second capacitor component 4 is an example of a third electronic component of this embodiment. The second capacitor component 4 is electrically connected to a first capacitor component 2 and the inductor component 3. The second capacitor component 4 is arranged on the second surface 20b of the capacitor element body 20 of the first capacitor component 2 and on the second surface 30b of the inductor element body 30 of the inductor component 3.

More specifically, outer electrodes are provided on the second surface 20b of the capacitor element body 20 of the first capacitor component 2 and on the second surface 30b of the inductor element body 30 of the inductor component 3, and these outer electrodes and the second capacitor component 4 are electrically connected to each other. In FIG. 10, illustration of the outer electrodes of the first and second capacitor components 2 and 4 and the inductor component 3 is omitted.

The first and second capacitor components 2 and 4 and the inductor component 3 are buried in the resin body 5 so as to be integrated with each other, similarly to as in the first embodiment. In FIG. 10, illustration of the resin body 5 is omitted. Similarly to the first embodiment, the outer electrodes of the first capacitor component 2 and the outer electrodes of the inductor component 3 are exposed from the first surface 5a of the resin body 5.

According to the sixth embodiment, the second capacitor component 4 is arranged on the second surface 20b of the capacitor element body 20 of the first capacitor component 2 and on the second surface 30b of the inductor element body 30 of the inductor component 3. Therefore, when the first surface 20a of the capacitor element body 20 and the first surface 30a of the inductor element body 30 are used as mounting surfaces, the second capacitor component 4 can be added without increasing the mounting surface area of the composite electronic component 1C.

In addition, since the second capacitor component 4 is added, for example, a π filter, in which capacitor components of different capacitances are used in combination with each other, can be formed by making the first and second capacitor components 2 and 4 have different capacitances.

The present disclosure is not limited to the above-described embodiments and design changes can be made within a range that does not depart from the gist of the present disclosure. For example, the characteristic features of the first to sixth embodiments may be combined with each other in various ways.

In the above-described embodiments, the number of outer electrodes of a capacitor component is two and the number of outer electrodes of an inductor component is two, but there may instead be three or more of the outer electrodes of each component.

In the above-described embodiments, the outer electrodes of the capacitor component and the outer electrodes of the inductor component are exposed from the same flat surface of the resin body, but may instead be exposed from different surfaces of the resin body.

In the above-described embodiments, the first electronic component is a capacitor component and the second electronic component is an inductor component, but each of the first electronic component and the second electronic component may be any one of a multilayer-type capacitor component, a multilayer-type inductor component or a winding-type inductor component. Furthermore, the first functional element and the second functional element may each include at least any one of an inductor element, an impedance element, a capacitor element, a resistor element and an ESD element. In addition, the first element body and the second element body may each be a dielectric or magnetic body.

A substrate that includes a functional element may be provided in addition to the configurations of the first to sixth embodiments. That is, a substrate having a plurality of mounting lands may be prepared, and the mounting lands of the substrate, and the outer electrodes of the capacitor component and the inductor component may be electrically connected to each other. Thus, the outer electrodes can be fabricated in any shape, and a further composite component can be formed without requiring a large mounting surface area. The functional component is at least one out of an inductor element, an impedance element, a capacitor element, a resistor element and an ESD element, for example.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A composite electronic component comprising:
  a first electronic component including a first element body, a first functional element that is provided inside the first element body, and first outer electrodes provided on one surface of the first element body and electrically connected to the first functional element;
  a second electronic component including a second element body, a second functional element provided inside the second element body, and second outer electrodes provided on one surface of the second element body and electrically connected to the second functional element;
  a third electronic component that is electrically connected to the first electronic component and the second electronic component; and
  a resin body in which the first electronic component and the second electronic component are buried so as to be integrated with each other such that the first outer electrodes and the second outer electrodes are exposed from the resin body, wherein
  the first outer electrodes and the second outer electrodes are exposed from one surface of the resin body, and
  the third electronic component is arranged on another surface of the first element body that is on the opposite side from the one surface of the first element body, and on another surface of the second element body that is on the opposite side from the one surface of the second element body.

2. The composite electronic component according to claim 1, wherein
  a spacer is provided between the first electronic component and the second electronic component.

3. The composite electronic component according to claim 1, wherein
  the first electronic component and the second electronic component contact each other.

4. The composite electronic component according to claim 3, wherein
the one surface of the first element body and the one surface of the second element body are located in the same plane, and
a shortest distance between the first outer electrodes and the second outer electrodes is around 50-80 µm.

5. The composite electronic component according to claim 1, wherein
the first functional element and the second functional element each include at least any one of an inductor element, an impedance element, a capacitor element, a resistor element and an ESD element.

6. The composite electronic component according to claim 1, wherein
the first electronic component and the second electronic component are each any one of a multilayer-type capacitor component, a multilayer-type inductor component and a winding-type inductor component.

7. The composite electronic component according to claim 1, wherein
the first element body and the second element body are each a dielectric body or a magnetic body.

8. The composite electronic component according to claim 1, wherein
the resin body includes a magnetic powder.

9. A composite electronic component manufacturing method for manufacturing a composite electronic component including a first electronic component having a first element body, a first functional element that is provided inside the first element body, and first outer electrodes provided on one surface of the first element body and electrically connected to the first functional element;
a second electronic component including a second element body, a second functional element provided inside the second element body, and second outer electrodes provided on one surface of the second element body and electrically connected to the second functional element; and
a resin body in which the first electronic component and the second electronic component are buried so as to be integrated with each other such that the first outer electrodes and the second outer electrodes are exposed from the resin body, said composite electronic component manufacturing method comprising:
aligning the first electronic component and the second electronic component such that the one surface of the first element body and the one surface of the second element body are located in the same plane and face a base,
arranging a first resin sheet on another surface of the first element body that is on the opposite side from the one surface of the first element body and on another surface of the second element body that is on the opposite side from the one surface of the second element body, heating and pressurizing the first resin sheet, and thereby burying in the first resin sheet a portion of the first element body up to a point partway between the other surface and the one surface of the first element body in the height direction and a portion of the second element body up to a point partway between the other surface and the one surface of the second element body in the height direction,
arranging a second resin sheet on the one surface of the first element body and on the one surface of the second element body, heating and pressurizing the second resin sheet, and thereby burying in the second resin sheet a portion of the first element body up to a point partway between the one surface and the other surface of the first element body in the height direction and a portion of the second element body up to a point partway between the one surface and the other surface of the second element body in the height direction.

10. The composite electronic component manufacturing method according to claim 9, further comprising:
arranging a resin sheet on another surface of the first element body that is on the opposite side from the one surface of the first element body and on another surface of the second element body that is on the opposite side from the one surface of the second element body, heating and pressurizing the resin sheet, and thereby burying in the resin sheet the entirety of the first element body in a height direction from the other surface of the first element body to the one surface of the first element body and the entirety of the second element body in the height direction from the other surface of the second element body to the one surface of the second element body.

11. The composite electronic component manufacturing method according to claim 9, further comprising:
aligning and burying inside a resin sheet a plurality of the first electronic components and a plurality of the second electronic components; and
cutting and dividing the resin sheet into pieces that each correspond to a set of the first electronic component and the second electronic component constituting a single composite electronic component.

12. The composite electronic component manufacturing method according to claim 9, further comprising:
providing a spacer between the first electronic component and the second electronic component, and fixing the first electronic component and the second electronic component to the spacer.

13. The composite electronic component manufacturing method according to claim 12, wherein
the spacer is substantially belt shaped, and a plurality of the first electronic components and a plurality of the second electronic components are fixed to the belt-shaped spacer.

14. A composite electronic component manufacturing method for manufacturing a composite electronic component including a first electronic component having a first element body, a first functional element that is provided inside the first element body, and first outer electrodes provided on one surface of the first element body and electrically connected to the first functional element;
a second electronic component including a second element body, a second functional element provided inside the second element body, and second outer electrodes provided on one surface of the second element body and electrically connected to the second functional element; and
a resin body in which the first electronic component and the second electronic component are buried so as to be integrated with each other such that the first outer electrodes and the second outer electrodes are exposed from the resin body, said composite electronic component manufacturing method comprising:
aligning the first electronic component such that the one surface of the first element body and the one surface of the second element body are located in the same plane and another surface of the first element body that is on the opposite side from the one surface of the first element body faces a base;

arranging a first resin sheet on the one surface of the first element body, heating and pressurizing the first resin sheet, and thereby burying in the first resin sheet a portion of the first element body up to a point partway between the one surface and the other surface of the first element body in the height direction;

aligning the second electronic component such that another surface of the second element body that is on the opposite side from the one surface of the second element body faces a base;

arranging the first resin sheet on the one surface of the second element body, heating and pressurizing the first resin sheet, and thereby burying in the first resin sheet a portion of the second element body up to a point partway between the one surface and the other surface of the second element body in the height direction; and arranging a second resin sheet on the other surface of the first element body and on the other surface of the second element body, heating and pressurizing the second resin sheet, and thereby burying in the second resin sheet a portion of the first element body up to a point partway between the other surface and the one surface of the first element body in the height direction and a portion of the second element body up to a point partway between the other surface and the one surface of the second element body in the height direction, wherein the first electronic component and the second electronic component are aligned such that the one surface of the first element body and the one surface of the second element body are located in the same plane.

15. The composite electronic component manufacturing method according to claim 14, further comprising:

exposing the first outer electrodes and the second outer electrodes from the second resin sheet.

16. The composite electronic component manufacturing method according to claim 15, wherein in the exposing step, the first outer electrodes and the second outer electrodes are exposed from the second resin sheet by removing part of the second resin sheet that covers the first outer electrodes and the second outer electrodes with a laser.

17. The composite electronic component manufacturing method according to claim 14, further comprising:

aligning and burying inside a resin sheet a plurality of the first electronic components and a plurality of the second electronic components; and cutting and dividing the resin sheet into pieces that each correspond to a set of the first electronic component and the second electronic component constituting a single composite electronic component.

18. The composite electronic component manufacturing method according to claim 14, further comprising:

providing a spacer between the first electronic component and the second electronic component, and fixing the first electronic component and the second electronic component to the spacer.

19. The composite electronic component manufacturing method according to claim 18, wherein the spacer is substantially belt shaped, and a plurality of the first electronic components and a plurality of the second electronic components are fixed to the belt-shaped spacer.

\* \* \* \* \*